J. M. NEIL.
FILTERING APPARATUS.
APPLICATION FILED JAN. 29, 1912.

1,045,095.

Patented Nov. 19, 1912.

2 SHEETS—SHEET 1.

WITNESSES
Fenton S. Belt
James B. Mansfield

INVENTOR
James M. Neil
By Alexander Powell
Attorneys

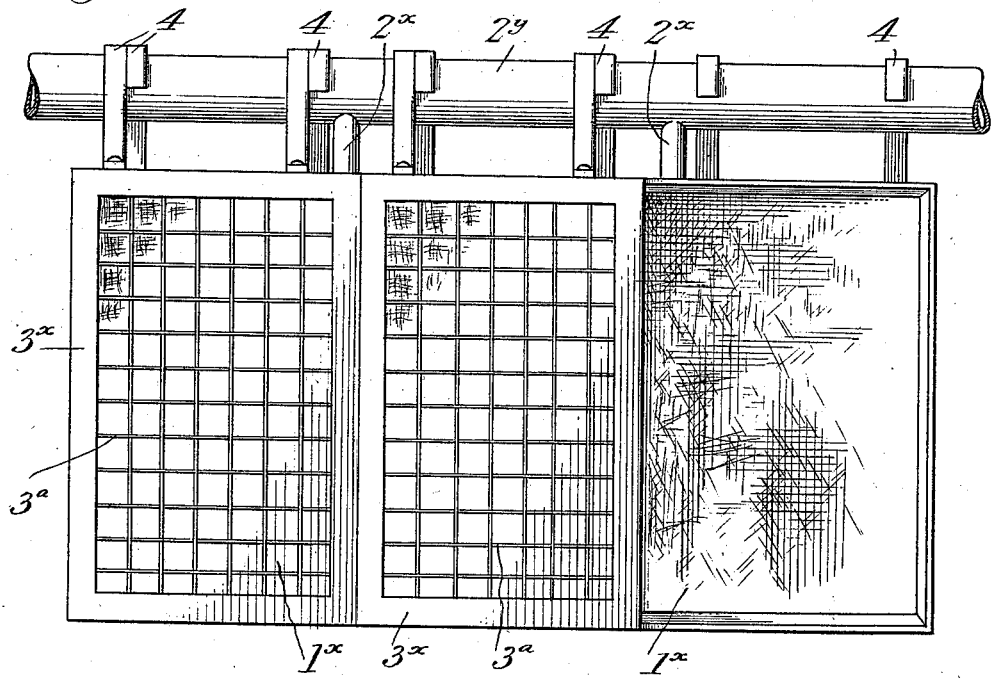

UNITED STATES PATENT OFFICE.

JAMES MILLAR NEIL, OF TORONTO, ONTARIO, CANADA.

FILTERING APPARATUS.

1,045,095. Specification of Letters Patent. Patented Nov. 19, 1912.

Application filed January 29, 1912. Serial No. 674,069.

*To all whom it may concern:*

Be it known that I, JAMES MILLAR NEIL, of Toronto, in the county of York, Province of Ontario, Dominion of Canada, have invented certain new and useful Improvements in Filtering Apparatus; and I hereby declare that the following is a full, clear, and exact description thereof, reference being had to the accompanying drawings, which form part of this specification.

This invention is designed for use in connection with that class of filters in which suspended solid matters are separated from liquids by passing the liquid through screens or hollow filtering mediums, preferably by suction, so that the matters suspended in the liquid are collected upon the outer surface of the screen or filtering medium.

The invention is particularly designed for use in the separation or filtration of solutions, such as wood pulp, sewage, etc., containing soft, pulpy, light, matters which will not readily compact or harden, and which, without the use of my invention, would be apt to drop from the surface of the filtering medium if the suction or flow of liquid therethrough should cease.

The object of the present invention is to enable the suspended matters when collected in mass upon the surface of the screen to be bodily separated from the solution or liquid being filtered either by withdrawing the filtering member from the solution, or by withdrawing the solution from the filtering member.

My invention also enables a large mass of such matters to be collected and separated from the solution at each filtering operation.

In the accompanying drawings I have illustrated one practical embodiment of my invention; and also a modification of the invention, showing its adaptability to some of the present known filtering apparatus; and I will explain the invention in detail with reference to said drawings, and summarize in the claims the novel features and combinations of parts embodied in the invention and for which protection is desired.

Figure 1:
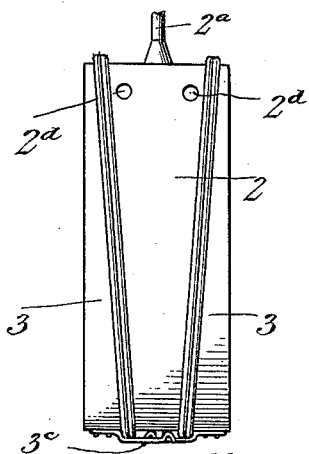
Figure 2:
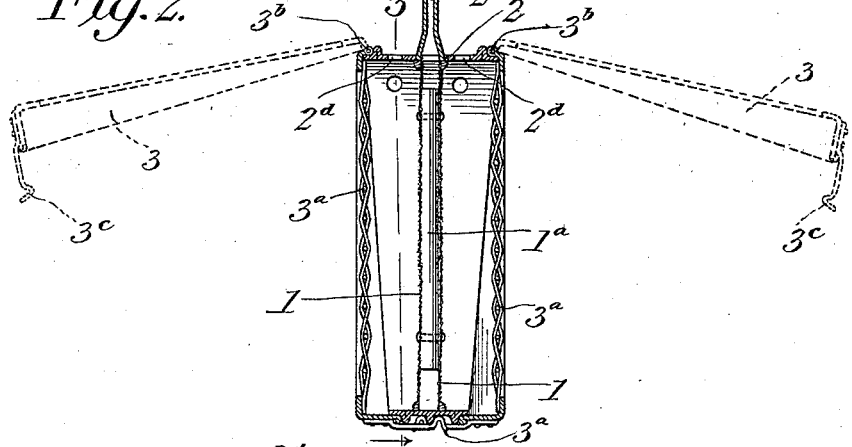
Figure 3:
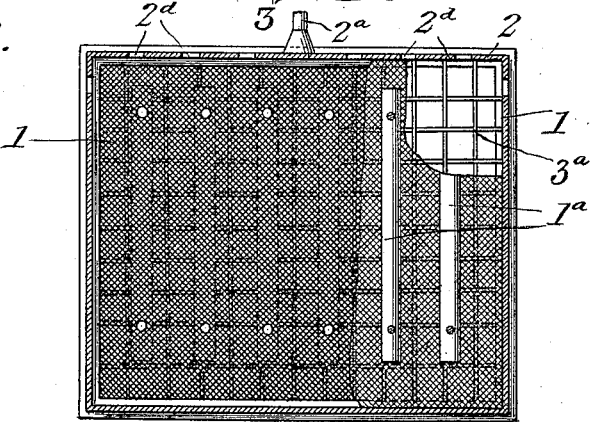

In said drawings: Figure 1 is an end view of a filtering member embodying the invention. Fig. 2 is a vertical sectional view thereof showing the retainers closed in full lines and open in dotted lines. Fig. 3 is a transverse sectional view on line 3—3, Fig. 2. Fig. 4 is an end elevation showing an adaptation of the invention. Fig. 5 is a vertical section through Fig. 4. Fig. 6 is a view showing a series of retainers used with one filter or screen.

As shown in Figs. 1 to 3 of the drawings, the filtering member preferably comprises two parallel vertically disposed screens, or filtering mediums, 1, 1, which are attached to a frame 2 of any suitable construction, so as to form a hollow filtering member. The screens 1 may be formed of any suitable material which will permit the passage of liquid but prevent the passage of floatage and solid or semi-solid matters suspended in the liquid. The space between the screens 1, 1, communicates with a pipe $2^a$ which is preferably connected with a suction apparatus (not shown) whereby liquid or air can be drawn through the filtering screens 1 and discharged to any suitable receiver.

The screens 1 may be separated by interposed spreaders $1^a$, which may be light strips of wood, so disposed as to prevent collapse of the screens under pressure or suction.

At the outer side of each screen 1, in accordance with my present invention, is arranged a retainer or basket adapted to hold the materials which may be drawn against the surface of the screen. This retainer comprises a suitable frame 3 approximately corresponding in area and general contour to the exterior contour of the screen surface, and preferably adapted to practically inclose or surround the latter. This frame 3 is open but its outer side is preferably provided with a coarse screen or lattice work $3^a$, preferably formed of light rods, or bars of wood, metal, or other suitable material; and which lattice work $3^a$ will not obstruct the passage of the liquid toward the screen, but the solid and semi-solid matters which are drawn against the outer surface of the screen will be caught and held in the retainer by the lattice work if the flow ceases, and will not be dissipated in the liquid in which the filter member may be immersed.

As shown in Fig. 1 the screen frame 2 may be made wider at top than at bottom, so that its ends taper outwardly from top to bottom; and the retainer frames 3 are wider at bottom than at top; that is their ends are tapered reversely to the ends of the frame 2. Preferably the upper sides of the retainer frames 3 are hinged to the upper side edges of the top member of the frame 2, as indicated at 3ᵇ; but when the retainers are in closed position against or around the screen, the lattice work is preferably at a substantially uniform distance from the screen surfaces.

When the apparatus is in working condition the lower members of the retainers should be fastened to the filter member or screen frame, so as to hold the retainers in proper position relative thereto as indicated in Figs. 1 and 2; any suitable devices may be used for this purpose. In the drawings are shown spring catches 3ᶜ adapted to engage a rib or notch at the lower edge of the filter frame.

In order to facilitate the admission of fluid to the upper part of the filter member, openings 2ᵈ may be formed in the top and end members of the filter frame to the outside of the screens, as indicated in the drawings.

In the practical use of my invention the retainers are placed opposite and against the sides of the filter frame, as indicated in Figs. 1 and 2, and the filter with the retainers is preferably submerged in the liquid to be filtered. The liquid may then be passed through the retainers and filter member either by forcing the liquid through the screens and out through pipe 2ᵃ, or, preferably, by attaching a suction apparatus to the pipe 2ᵃ and drawing the clear liquid from the solution through the filter member to a suitable point of discharge. In either case the floatage and matters held in suspension in the unfiltered liquid will pass through the lattice work 3ᵃ into the retainers and will be drawn to or against the outer surface of the filtering medium or screens 1 to which they will tend to adhere, and such withdrawal of the clear liquid can be continued until the screen surfaces have become so coated with the foreign matters that it is desirable or necessary to remove same from the screen surface; or until the retainers have practically become filled with the suspended matters. Then the filtering medium can be separated from the liquid,—either by withdrawing the liquid from the tank in which the medium is located, or by lifting the filtering medium and retainers bodily from the tank, the suction being preferably continued so as to cause the matters to adhere to the outer surface of the screen and remain in the retainers after separating the medium from the liquid. When it is desired to discharge the matters the retainers are opened, as indicated in dotted lines in Fig. 2, and all the matters therein may be dropped into any suitable receiver.

Certain materials, such as wood pulp, sewage, and other matters suspended in effluents, are of a jelly-like or pasty consistency and will not cake solidly, and but for the retainers would fall back into the tank, or part from the filter member as soon as the latter was separated from the liquid; but by the employment of retainers these soft matters are caught, and can be collected and removed in quantities at each screening operation.

In Figs. 4 to 6 I have indicated how the invention might be usefully adapted to a known form of suction filter, such consisting of a hollow filter body provided with permeable walls 1ˣ, 1ˣ, of suitable filtering material, substantially as above described, and the interior of which is connected by a pipe 2ˣ to a suction header 2ʸ which extends across or above the tank in which such filter body is suspended. In adapting my invention to such filter bodies I provide removable retainers 3ˣ which may correspond in area and contour with the screens 1ˣ and which are each provided on their outer sides with a lattice 3ᵃ, such as already described. These retainers are provided with hooks 4 on their upper ends, which can be readily engaged with the pipe 2ʸ and suspend the retainers therefrom. If the filtering mediums 1ˣ are very large in area a series of retainers might be provided, as indicated in Fig. 6, which retainers can be hung side by side and against the faces of the filtering medium, and can be handled more readily than a very large retainer could be. When such retainers are used they can be readily removed, or swung upward, one at a time, so as to discharge their contents; and such removable retainers can be readily applied to the filters now in use.

While I have shown in the drawings the filtering member as having filtering mediums or screens on both sides, it is obvious that the invention will be operative with a filtering member having but one screen or filtering surface. The form of retainers indicated in the drawings with the lattice work are very efficient, but I do not consider the invention restricted to the particular form of such retainers as shown in the drawings.

What I claim is:

1. In combination, a filtering member having a substantially vertically disposed filtering surface adapted to be submerged in the liquid to be filtered; with a device attachable to said member opposite its filtering surface and adapted to retain the accumulations collected at the surface of said member when the filter is separated from the liquid.

2. In combination with a filtering member having substantially vertically disposed filtering surfaces adapted to be submerged in the liquid to be filtered and through which the liquid to be filtered is passed; with devices connected to the filtering member opposite the vertical surfaces thereof to retain the matters accumulated upon such surfaces when the filter is separated from the liquid.

3. In combination, a filtering member having a substantially vertically disposed filtering surface adapted to be submerged in the liquid to be filtered; with a retainer movably attached to the filtering member opposite the vertical surface thereof and adapted to hold the matters accumulated upon such surface thereof when the filter is separated from the liquid.

4. In combination with a hollow double faced filtering member through which the liquid to be filtered is drawn, with devices attached to the member opposite both faces thereof and adapted to retain the solid matters collected upon or drawn against such faces when the filter is separated from the liquid.

5. In combination, a hollow filtering member having opposite filtering surfaces through which the liquid to be filtered is to be drawn, with opposite retainers movably connected with the member adjacent the opposite filter surfaces thereof and adapted to retain the solid matters collected upon or drawn against such surfaces when the filter is separated from the liquid.

6. In combination, a filtering medium, a frame surrounding the vertical face of the filtering medium, and a vertically disposed retainer attached to said frame whereby the solid matters drawn against or toward the said face of the filtering medium by the passage of liquid therethrough are retained when the medium is separated from the liquid.

7. In combination with a hollow filtering member having a substantially vertically disposed filtering surface and adapted to be submerged in the liquid to be filtered, and means for passing liquid therethrough; of an adjustable retainer connected to the filter frame opposite the vertical filtering surface and adapted to retain the matters drawn toward the filter by the flow of the liquid when the filtering member is removed from the liquid.

8. In combination, a hollow filtering member and a frame surrounding said member; with a retainer comprising a frame hingedly connected to the filter frame and adapted to retain the matters drawn toward the filter by the flow of the liquid, said retainer being openable to discharge the accumulated matters.

9. In combination with a hollow filter, and a frame surrounding the filter; with adjustable retainers attached to the opposite sides of said filter frame, said retainers being adapted to permit the free passage of liquid to the filter but to retain any solid matters arrested by the filtering surfaces, and means for holding said retainers in position against the sides of the filter during the filtering operation.

10. In combination, a hollow filtering medium, and a frame surrounding said medium; with a retainer comprising a frame connected to the frame of the filtering medium, and a lattice attached to said retainer frame whereby the solid matters drawn against or toward the face of the filtering medium by the passage of liquid therethrough are retained when the filter is separated from the liquid.

In testimony that I claim the foregoing as my own, I affix my signature in presence of two witnesses.

JAMES MILLAR NEIL.

Witnesses:
RUSSELL L. LAWK,
GRACE F. NIEMANN.

Copies of this patent may be obtained for five cents each, by addressing the "Commissioner of Patents, Washington, D. C."